United States Patent [19]

Baker et al.

[11] Patent Number: 4,814,359
[45] Date of Patent: Mar. 21, 1989

[54] PROCESS FOR PRODUCING FLEXIBLE POLYURETHANE FOAM USING HEXAHYDRO-S-TRIAZINE CATALYSTS

[75] Inventors: Otis M. Baker, St. Albans; Frank E. Critchfield, South Charleston; Paul M. Westfall, St. Albans, all of W. Va.

[73] Assignee: Union Carbide Corporation, Danbury, Conn.

[21] Appl. No.: 139,758

[22] Filed: Dec. 30, 1987

[51] Int. Cl.$^4$ ................................. C08J 9/12
[52] U.S. Cl. ........................................ 521/129; 528/54
[58] Field of Search ............................ 521/129; 528/54

[56] References Cited

U.S. PATENT DOCUMENTS

| | | | |
|---|---|---|---|
| 3,689,440 | 9/1972 | Glassmar | 260/2.5 |
| 3,723,366 | 2/1973 | Kan | 260/2.5 |
| 3,981,829 | 9/1976 | Cenker et al. | 260/2.5 |
| 4,025,469 | 5/1977 | Kauffman | 260/2.5 |
| 4,066,580 | 1/1978 | Fralkenstein et al. | 260/2.5 |
| 4,088,615 | 5/1978 | Sandner et al. | 521/111 |
| 4,107,151 | 8/1978 | Takahashi et al. | 521/54 |
| 4,141,862 | 2/1979 | Raden et al. | 260/2.5 |
| 4,228,310 | 10/1980 | Speranza et al. | 568/2.5 |
| 4,275,169 | 6/1981 | Rudner et al. | 521/112 |
| 4,722,942 | 2/1988 | Nichols et al. | 521/110 |

FOREIGN PATENT DOCUMENTS 26677  5/1963  Japan .

*Primary Examiner*—Morton Foelak
*Attorney, Agent, or Firm*—Paul W. Leuzzi

[57] ABSTRACT

Hexahydro-s-triazines, and in particular hexamethylenetetramine (HMT), can be used in high water (5.0 or more parts per hundred parts of polyol) flexible polyurethane foams formulations in place of conventional gellation catalysts to produce open celled molded foams with excellent surfaces and with cores free of discoloration.

10 Claims, No Drawings

PROCESS FOR PRODUCING FLEXIBLE POLYURETHANE FOAM USING HEXAHYDRO-S-TRIAZINE CATALYSTS

BACKGROUND OF THE INVENTION

1. Field of The Invention

The present invention relates to the use of hexahydro-s-triazine catalysts in the preparation of flexible polyether polyurethane foams. More particularly, the instant invention relates to the use of hexamethylenetetramine as a catalyst.

2. Description of the Prior Art

Catalysts for flexible polyurethane foams generally fall into two categories: the metal salts that promote the isocyanate polyol (gellation) reaction and the tertiary amines that promote the isocyanate-water (blowing) reaction.

Of course none of these catalysts are specific and each catalyst within a given category has catalytic activity for both competing reactions which must be balanced to achieve optimum polyurethane foam. For example, tin salts such as stannous octoate are very specific for the gellation reaction but also catalyze the reaction between isocyanates with water to form ureas and carbon dioxide. Bis(2 dimethylaminoethyl) ether is highly specific for the blowing reaction but it also catalyzes the reaction between isocyanates with polyols. Triethylenediamine (TEDA) is an example of a tertiary amine that is relatively effective in both the gellation reaction and the blowing reaction.

With high resiliency (HR) foams, where more reactive polyols are generally employed, very little tin catalysts can be used because the foam cell walls are less prone to rupture than with conventional foams, and this can result in shrinkage problems. In fact, most HR foams have to be mechanically crushed to prevent this problem. Accordingly, most or all of the tin catalyst is replaced with triethylenediamine to achieve the reaction required for final cure. Also, auxiliary tertiary amine catalysts such as pentamethyldipropylenetriamine that are significantly active for both the blowing and gellation reactions are used to decrease the overall levels of the more expensive and specific amines.

Achieving the optimum catalytic balance is particularly difficult for rapid cure, low density HR Foams which are currently of significant commercial importance.

Density reduction in such foams is achieved by either increasing the water level, and thus carbon dioxide evolution, or by the use of chlorofluorocarbons. Because of environmental concerns with the chlorofluorocarbons, the former approach is preferred. However, as the water level is increased, the exotherm increases creating a large temperature gradient between the foam core and the mold surface. Using a conventional amine catalyst like TEDA, this results in foam surface densification that extends significantly towards the core of the foam. In addition, at very high water levels, e.g. 6.5 or more parts per hundred parts of polyol, the center of the foam is discolored (scorched), presumably because of the very high exotherm and the basicity of the catalyst.

It has surprisingly been found that hexahydro s-triazine compounds, and preferably hexamethylenetetramine (HMT), when substituted for conventional amine catalysts, greatly minimizes the densification and discoloration problems associated with low density foam employing high water levels.

Hexahydro-s-triazine compounds, and hexamethylenetetramine (HMT) in particular, are known to the art and the latter has been widely used as crosslinking agents for organic rubbers and phenolic resins. U.S. Pat. No. 4,275,169 discloses the use of HMT in the manufacture of polyester based flexible polyurethane foam with improved combustibility resistance. HMT is also disclosed in U.S. Pat. No. 3,689,440 with aromatic polyols to impart thermal stability to rigid urethane foams. The use of HMT, dispersed in waxy materials, such as stearic acid, to form large voids in polyurethane foams is disclosed in Japanese Pat. No. 67020798.

The patent literature is also replete with examples of the use of hexahydro-s-triazines in polyurethane foams, particularly to induce isocyanurate formation and thus improve combustibility resistance. The most commonly cited triazine is 1,3,5 tris(3 dimethylaminopropyl)-s-hexahydrotriazine (F-DMAP) which is used to promote isocyanaurate formation. Patents that describe these uses are: U.S. Pat. Nos. 4,228,310, 4,141,862; 4,066,580, 3,981,829, and 3,723,366. None of these patents describe the use of HMT alone in polyether flexible polyurethane foams or in blends with F-DMAP.

OBJECTS OF THE INVENTION

The primary object of the present invention is to prepare flexible polyurethane foams using a new class of catalysts.

Another object of the present invention is to have the flexible polyurethane foams be of the low density, high resiliency-type.

Yet another object of the present invention is to avoid the use of chlorofluorocarbons in preparing these low density, high resiliency foams.

Another object of the present invention is to solve the densification and discoloration problems generally associated with high water, low density HR foams.

Other objects of this invention will become apparent from the description and examples set forth hereafter.

SUMMARY OF THE INVENTION

It has been found that hexahydro-s-triazine compounds, preferably hexamethylenetetramine (HMT), greatly minimize the densification and discoloration problems associated with low- density HR foams made from high water formulations.

DETAILED DESCRIPTION OF THE INVENTION

The present invention provides a process for producing HR polyurethane foams which include reacting: (a) a polyol or polymer/polyol and (b) an organic polyisocyanate in the presence of (c) a catalyst for the reaction of (a) and (b) to produce the polyurethane foam. The reaction is generally carried out in the presence of a blowing agent and a foam stabilizer. The reaction and foaming operations can be performed in any suitable manner, preferably by the one shot technique.

The Hexahydro-s-triazine Catalysts

The hexahydro-s-triazines compounds useful in this invention are hexamethylenetetramine:

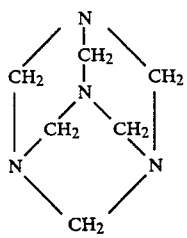

and 1,3,5 tris (N,N-dialkylaminoalkyl) s-hexahydrotriazines of the following generic structure:

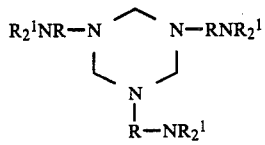

wherein R is alkylene group having from two to four carbon atoms, and $R^1$ is an alkyl group having from 1 to 6 carbon atoms, preferably methyl or ethyl.

The hexahydro-s-triazines useful in the present invention are generally prepared by the reaction between formaldehydes and amines or ammonia as taught in U.S. Pat. No. 4,025,469.

Some of the hexahydro-s-triazines are solids that remain insoluble in polyols. Thus, the use of solvents may be required. The preferred material, HMT, is soluble in both water and glycerine. Glycerine is the preferred solvent since it has the additional advantage of delaying the blowing reaction and thus assist in balancing these two competing reactions. Generally, when a solvent is employed the hexahydro-s-triazine solution should be on the order of 1 to 40%, preferably 10 to 25% catalyst.

Most preferably, a solution of 15% HMT in glycerine provides a liquid component for convenient addition to the foam formulation. The ratio of these two components is the ideal range for their use levels (1 to 3%) in the present invention.

The hexahydro-s-triazines of this invention can be used from about 0.05 to 5% based on the reacting mixture. Most preferably, they are used in the range of 0.1 to 0.5%. Hexamethylenetetramine can be used as the sole hexahydro-s-triazine of this invention while the other hexahydro-s-triazines must be used with HMT to achieve the desired effects. When mixtures are employed the HMT must be present in an amount equal to at least 25% of the total hexahydro-s-triazine catalyst charge.

Polyol

The polyol, or blends thereof, employed depends upon the end use of the polyurethane foam to be produced. The molecular weight or hydroxyl number of the polyol is selected so as to result in flexible foams when the polyol is converted to a polyurethane. The hydroxyl number of the polyols employed can accordingly vary over a wide range. In general, the hydroxyl number of the polyols employed may range from about 20 (or lower) to about 70 (and higher). As a further refinement, the specific foam application will likewise influence the choice of the polyol. As an example, for molded foam, the hydroxyl number of the polyol may be on the order of about 20 to about 40, and for slab-stock the hydroxyl number may be on the order of about 25 to about 70.

The hydroxyl number limits described above are not intended to be restrictive, but are merely illustrative of the large number of possible combinations for the polyols used.

The hydroxyl number is defined as the number of milligrams of potassium hydroxide required for the complete hydrolysis of the fully phthalated derivative prepared from one gram of polyol. The hydroxyl number can also be defined by the equation:

$$OH = (56.1 \times 1000 \times f)/m.w.$$

where
 OH = hydroxyl number of the polyol
 f = functionality, that is, average number of hydroxyl groups per molecule of polyol
 m.w. = number average molecular weight of the polyol.

Substantially any of the polyols previously used in the art to make polyurethanes can be used as the polyol in this invention. Illustrative of the polyols useful in producing polyurethanes in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:
 (a) alkylene oxide adducts of polyhydroxyalkanes;
 (b) alkylene oxide adducts of nonreducing sugars and sugar derivatives;
 (c) alkylene oxide adducts of phosphorus and polyphosphorus acids;
 (d) alkylene oxide adducts of polyphenols;
 (e) the polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3 dihydroxybutane, 1,4 dihydroxybutane, 1,4, 1,5 and 1,6 dihydroxyhexane, 1,2-, 1,3- 1,4,1, 6-, and 1,8 dihydroxyoctane, 1,10 dihydroxydecane, glycerol, 1,2,4-trihydroxybutane, 1,2,6-trihyroxyhexane, 1,1,1-trimethylolethane, 1,1,1-trimethylolpropane, pentaerythritol, polycaprolactone, xylitol, arabitol, sorbitol, mannitol, and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl glucoside, and the like, glycol glycosides such as ethylene glycol glucoside, propylene glycol glycoside, glycerol glucoside, 1,2,6-hexanetriol glucoside, and the like, as well as the alkylene oxide adducts of the alkyl glycosides as set forth in U.S. Pat. No. 3,073,788.

The alkylene oxide adducts of phosphorus and polyphosphorus acids are another useful class of polyols. Ethylene oxide, 1,2-epoxypropane, the epoxybutanes, 3-chloro-1,2 epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

Indeed, any material having an active hydrogen as determined by the Zerewitinoff test may be utilized as the polyol. For example, amine terminated polyether polyols are known and may be utilized, if desired.

The most preferred polyols employed in this invention include the poly(oxypropylene) glycols, triols, and higher functionality polyols, and the like that are capped with ethylene or propylene oxide as dictated by the reactivity requirements of the particular polyurethane application. Generally, the nominal functionality of such polyols will be in the range of about 3 to 4 or so. These polyols also include poly-(oxypropylene-oxyethylene) polyols; however, desirably, the oxyethylene content should comprises less than 80 percent of the total and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polyol chain.

In addition to these conventional polyols, polymer/polyols may be used alone or blended with other polyols. Polymer/polyols are well known in the art. The basic patents in the field are U.S. Pat. No. Re. 28,715 (reissue of U.S. Pat. No. 3,383,351) and U.S. Pat. No. Re. 29,118 (reissue of U.S. Pat. No. 3,304,273). Such compositions can be produced by polymerizing one or more ethylenically unsaturated monomers dissolved or dispersed in a polyol in the presence of a free radical catalyst to form a stable dispersion of polymer particles in the polyol. These polymer/polyol compositions have the valuable property of imparting to polyurethane foams produced therefrom higher load bearing properties than are provided by the corresponding unmodified polyols. Also included are the polyurethane and polyurea polymer/polyols as taught in U.S. Pat. Nos. 3,325,421 and 4,374,209.

Conceptually, a wide variety of monomers may be utilized in the preparation of the polymer/polyol compositions in accordance with the invention. Numerous ethylenically unsaturated monomers are disclosed in the prior patents. Any of these monomers should be suitable.

The selection of the monomer or monomers used will depend on considerations such as the relative cost of the monomers and the polyurethane product characteristics required for the intended application. To impart the desired load-bearing to the foams, the monomer or monomers used in preparing the polymer/polyol should, of course, desirably be selected to provide a polymer which has a glass transition of at least slightly higher than room temperature. Exemplary monomers include styrene and its derivatives such as para-methylstyrene, acrylates, methacrylates such as methyl methacrylate, acrylonitrile and other nitrile derivatives such as methacrylonitrile, and the like. Vinylidene chloride may also be employed.

The preferred monomer mixtures used to make the polymer/polyol compositions are mixtures of acrylonitrile and styrene or acrylonitrile, styrene and vinylidene chloride.

The monomer content will be typically selected to provide the desired solids content required for the anticipated end-use application In general, it will usually be desirable to form the polymer/polyols with as high a resulting polymer or solids content as will provide the desired viscosity and stability properties.

For typical HR foam formulations, solids content of up to about 45 weight percent or more are feasible and may be provided. In slabstock applications, the tendency is to utilize as high a solids content as possible, contents of 45 weight percent to about 50 weight percent or more being desired commercially for some applications.

Isocyanates

The organic polyisocyanates that are useful in producing polyurethane foam in accordance with this invention are organic compounds that contain at least two isocyanato groups. Such compounds are well-known in the art. Suitable organic polyisocyanates include the hydrocarbon diisocyanates (e.g., the alkylene diisocyanates and the arylene diisocyanates), as well as known triisocyanates and polymethylene poly (phenylene isocyanates). Examples of suitable polyisocyanates are 2,4-diisocyanatotoluene, 2,6-diisocyanatotoluene, methylene bis(4 cyclohexyl isocyanate), 1,8-diisocyanatooctane, 1,5-diisocyanato 2,2,4-trimethylpentane, 1,9-diisocyanatononane, 1,10-diisocyanatopropyl)ether of 1,4 butylene glycol, 1,11-diisocyanatoundecane, 1,12-diisocyanatododecane bis(isocyanatohexyl) sulfide, 1,4-diisocyanatobenzene, 3,5-diisocyanato-o-xylene, 4,6-diisocyanato-m-xylene, 2,6-diisocyanato-p-xylene, 2,4-diisocyanato-l-chlorobenzene, 2,4 diisocyanato-l-nitrobenzene, 2,5-diisocyanato-l-nitrobenzene, 4,4'-diphenylmethylene diisocyanate, 3,3'-diphenyl-methylene diisocyanate, and polymethylene poly (phenyleneisocyanates), and mixtures thereof. The preferred polyisocyanates are TDI (80% 2,4-tolylene diisocyanate and 20%, 2,6-tolylene diisocyanate), MDI (diphenylmethane diisocyanate alone or mixtures with its polymeric forms) and mixtures of TDI with MDI.

Other Catalysts

In addition to the hexahydro-s-triazine catalysts, any known catalysts useful in producing polyurethanes may be employed. The tertiary amines may be used as secondary catalysts for accelerating the gellation reaction and/or the blowing reaction in combination with one or more of the above-noted hexahydro-s-triazine catalysts. Metal catalysts, or combinations of metal catalysts, may also be employed as the secondary catalysts. The catalysts are employed in small amounts, for example, from about 0.001 percent to about 5 percent, based on the weight of the reaction mixture. Representative catalysts include: (a) tertiary amines such as bis(2,2'-dimethylamino)ethyl ether, trimethylamine, triethylamine, N methylmorpholine, N-ethylmorpholine, N,N-dimethylbenzylamine, N,N-dimethylethanolamine, N,N,N',N'-tetramethyl-1,3-butanediamine, pentamethyldipropylenetriamine, triethanolamine, triethylenediamine, pyridine oxide and the like; (b) strong bases such as alkali and alkaline earth metal hydroxides, alkoxides, and phenoxides; (c) acidic metal salts of strong acids such as ferric chloride, stannic chloride, stannous chloride, antimony trichloride, bismuth nitrate and chloride, and the like; (d) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (e) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (f) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin bis(4 methylaminobenzoate), dibutyltin bis(6 methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltindilaurylmercaptide, dibutyltin-bis(2 -dimethylaminopentylate), dibutyltin dichloride, dioctyltin dichloride, and the like.

Blowing Agents

When the polyurethane foam is formed, a small amount of a blowing agent is employed in the reaction mixture. For the purposes of the present invention, the primary blowing agent is water from about 0.5 to about 20, preferably 5 to 8, parts per hundred parts of polyol, based upon total weight of the polyol composition, alone or with other suitable blowing agents which are vaporized by the exotherm of the reaction. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating such as N,N'-dimethyl N,N'-dinitrosoterephthalamide, amine formates, formic acid and the like. The generally preferred method of foaming for producing HR flexible foams is the use of water, or a combination of water plus a fluorocarbon blowing agent such as trichloromonofluoromethane. The quantity of blowing agent employed will vary with factors such as the density desired in the foamed product.

The scorch-free advantages of the foams are most evident at water levels of 5 or more parts per hundred parts of polyol. This results in a foam having a density less than 1.5 pounds per cubic foot.

Stabilizers

It is also within the scope of the invention to employ, when applicable, small amounts, e.g., about 0.001 percent to 5.0 percent by weight, based on the total reaction mixture, of a foam stabilizer. Suitable foam stabilizers or surfactants are known and may vary depending upon the particular polyurethane application. Suitable stabilizers for slabstock applications include "hydrolyzable" polysiloxane-polyoxyalkylene block copolymers such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,686,254 and British patent specification No. 1,220,471. The latter class of copolymers differs from the above mentioned polysiloxane-polyoxylakylene block copolymers in that the polysiloxane moiety is bonded to the polyoxy-alkylene moiety through direct carbon-to-silicon bonds, rather than through carbon-to-oxygen to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924.

The polyurethanes so produced may be utilized in flexible foam applications where any conventional type of flexible polyurethane is or can be utilized. The polyurethanes find particular utility in the production of high resiliency foams for use in arm rests, mattresses, automobile seats, and the like, as well as in slabstock foams for use as carpet underlayment, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

As used in the Examples, the following designations, symbols, terms and abbreviation have the following meanings:

Polyol A—A polyol made by reacting propylene oxide with glycerine in the presence of potassium hydroxide catalyst, capping with ethylene oxide and refining to remove catalyst. The polyol contains about 16.5 weight percent ethylene oxide as a cap and has a hydroxyl number of about 28.

Polyol B—A polyol made by reacting propylene oxide with glycerine in the presence of potassium hydroxide catalyst, capping with ethylene oxide and refining to remove catalyst. The polyol contains about 19 weight percent ethylene oxide as a cap and has a hydroxyl number of about 35.

Polyol C—A polyol made by reacting propylene oxide with glycerine in the presence of potassium hydroxide catalyst, capping with ethylene oxide and refining to remove catalyst. The polyol contains about 9 weight percent ethylene oxide as a cap and has a hydroxyl number of about 31.

Polyol D—A polyol made by reacting propylene oxide with glycerine in the presence of potassium hydroxide catalyst, capping with ethylene oxide and refining to remove catalyst. The polyol contains about 19 weight percent ethylene oxide as a cap and has a hydroxyl number of about 28.

Polymer/Polyol A—A polymer/polyol sold by Union Carbide Corporation as "NIAX Polyol E-650". It contains 33 weight percent polymer and has a hydroxyl number of 24.

Polymer/Polyol B—A polymer/polyol sold by Union Carbide Corporation as "NIAX Polyol E-654". It contains 28 weight percent polymer and has a hydroxyl number of 25.

Polyol E—A propylene/ethylene oxide adduct of butanol sold by Union Carbide as "UCON Fluid 50HB5100".

Graft A—A 10 percent by weight graft of acrylic acid on Polyol E.

Polyol F—A polyol comprising 90 percent by weight of Polyol A and 10 percent of Graft A neutralized with a 33 percent solution of KOH.

Polyol G—A nine mole adduct of ethylene oxide on nonyl phenol.

HMT—hexamethylenetetramine

F—DMAP—1, 3, 5 tris (dimethylaminopropyl)-s-hexahydrotriazine

HMT—G—a 15 percent solution of HMT in glycerine

Catalyst A—A polyurethane foam triethylenediamine catalyst sold as "NIAX Catalyst A 33" by Union Carbide Corporation.

Catalyst B—a polyurethane foam pentamethyldipropylenetriamine catalyst sold as "Polycat 77" by Air Products Corporation.

Catalyst C—A polyurethane foam bis (2-dimethylaminoethyl)ether catalyst sold as "NIAX Catalyst A-1" by Union Carbide Corporation.

Catalyst D—dibutyltin dilauryl mercaptide

Surfactant A—A silicone surfactant sold for use in high resiliency foam by Union Carbide Corporation as "Silicone Surfactant Y-10,459".

Surfactant B—A silicone surfactant sold for use in high resiliency foam by Union Carbide Corporation as "Silicone Surfactant Y-10,515".

TDI—A mixture of 80 weight percent 2,4-diisocyanatotoluene and 20 weight percent 2,6-diisocyanatotoluene.

Cream Time—is the time from the addition of the isocyanate during mixing of the components until the visible movement or expansion of the foam mixture begins.

Exit Time—is the time when the foaming mixture first begins to extrude from the vent holes in the mold.

Vent Collapse—is the sum of the area of the large cells or voids that can occur in the foam at the four 1/16" vent holes in the rectangular mold.

PROCEDURE

Prior to preparing the foaming mixture it was necessary to prepare the mold properly. The mold was heated to above 165° F. in a forced air oven (250° F.), then removed from the oven and sprayed with mold release. The mold was then cooled to 130° F. to 160° F. depending on the optimum temperature for a given formulation. The preparation of the foaming mixture was timed so that the mold was at or near optimum temperature at the time of pour.

Each formulation was prepared by first mixing all of the ingredients except the TDI at 4000 rpm for 55 seconds. After mixing was stopped the correct level of TDI was added quickly. Then the mixer was started and the mixing at 4000 rpm was continued for 5 seconds. After the mixing was completed the contents of the mixing container were immediately poured into a waxed, heated (130°-160° F.) aluminum mold (15"×15"×5") provided with a lid hinged to the mold and four vent holes of 1/16 inch in diameter drilled close to each corner of the lid. The lid is provided with a latch for holding it in closed position. After pouring the resultant mixture into the mold the lid was closed and latched. The mixture in the mold was allowed to foam and fill the mold. Some of the foam extruded through the four vent holes. The foam was allowed to set for 2 minutes from pour and then placed in a 250° F., forced air oven for 3 minutes. The foam was demolded after a total of 2 to 5 minutes from pour. The form part was immediately hand crushed and then passed 3 times through crushing rollers (90% crush). After the crushing step the foam part was placed in a forced air oven at 250° F. for a 30 minute postcure period. The parts were then placed in a constant temperature (72° F.) constant humidity (50% RH) room and conditioned for 24 hours before testing for physical properties.

EXAMPLES 1 TO 6

The following examples were run using the formulations shown in the tables set forth below and following the procedure described above.

TABLE I

| | Example 1 | Example 2 | Example 3 |
|---|---|---|---|
| Formulation, wt. pts. | | | |
| Polyol C | 70.0 | 70.0 | 70.0 |
| Polymer/Polyol A | 12.0 | 12.0 | 12.0 |
| Polymer/Polyol B | 18.0 | 18.0 | 18.0 |
| $H_2O$ | 6.0 | 6.0 | 6.0 |
| Diethanolamine | 0.05 | — | — |
| Glycerine | 1.5 | 2.0 | 2.0 |
| Catalyst C | 0.1 | 0.2 | 0.2 |
| Catalyst A | — | 0.05 | 0.3 |
| HMT | 0.22 | 0.67 | 0.67 |
| Polyol F | 3.0 | 3.0 | 3.0 |
| Catalyst B | 0.05 | — | — |
| Catalyst D | 0.015 | 0.015 | 0.015 |
| Silicone Surfactant B | 1.5 | 2.0 | 2.0 |
| Silicone Surfactant A | 0.25 | — | — |
| Polyol G | 1.0 | 1.0 | 1.0 |
| TDI | 100 Index | 100 Index | 100 Index |
| Foam Characteristics | | | |
| Cream Time, seconds | 15.0 | 13.0 | 13.0 |
| Exit Time, seconds | 65.0 | 50.0 | 40.0 |
| Quality | Open celled surface much less scorch than with Catalyst A | Open celled surface | Closed surface rough skin |

TABLE II

| | Example 4 |
|---|---|
| Formulation, wt. pts. | |
| Polyol B | 30.0 |
| Polymer/Polyol A | 20.0 |
| Polyol D | 50.0 |
| $H_2O$ | 6.5 |
| HMT-G | 2.5 |
| Catalyst C | 0.09 |
| Polyol F | 3.0 |
| F-DMAP | 0.7 |
| Catalyst D | 0.01 |
| Silicone Surfactant A | 3.0 |
| TDI Index | 96 Index |
| Foam Characteristics | |
| Cream Time, seconds | 10.0 |
| Exit Time, seconds | 38.0 |
| Quality | No scorch, no vent collapse onion skin |

TABLE III

| | Example 5 |
|---|---|
| Formulation, wt. pts. | |
| Polyol B | 30.0 |
| Polymer/Polyol A | 20.0 |
| Polyol D | 50.0 |
| $H_2O$ | 6.5 |
| HMT-G | 2.5 |
| Catalyst C | 0.09 |
| Catalyst B | 0.45 |
| Catalyst D | 0.006 |

TABLE III-continued

|  | Example 5 |
| --- | --- |
| Silicone Surfactant A | 2.5 |
| TDI Index | 96 Index |
| Foam Characteristics | |
| Cream Time, seconds | 9.0 |
| Exit Time, seconds | 31.0 |
| Quality | Smooth uniform celled surface, open foam, ¼" vent collapse |

TABLE IV

|  | Example 6 |
| --- | --- |
| Formulation, wt. pts. | |
| Polyol B | 30.0 |
| Polymer/Polyol A | 20.0 |
| Polyol D | 50.0 |
| H$_2$O | 2.5 |
| HMT-G | 2.5 |
| Catalyst C | 0.09 |
| Catalyst B | 0.45 |
| Catalyst D | 0.006 |
| Silicone Surfactant A | 2.5 |
| TDI Index | 96 Index |
| Foam Characteristics | |
| Cream Time, seconds | 10.0 |
| Exit Time, seconds | 51.0 |
| Quality | Excellent surface, open foam, no vent collapse |

We claim:

1. A process for preparing flexible polyurethane foams which comprises reacting:
    (a) a polyether polyol and
    (b) an organic polyisocyanate, in the presence of a hexahydro-s-triazine catalyst, a foam stabilizer and a blowing agent wherein the hexahydro-s-triazine catalyst is hexamethylenetetramine or mixtures of hexamethylenetetramine with 1,3,5-tris(N,N dialkylaminoalkyl)-s-hexhydrotriazines.

2. The process of claim 1 wherein the catalyst is used in an amount from 0.05 to 5 weight percent based on the total weight of (a) and (b).

3. The process of claim 2 wherein the catalyst is used in an amount from 0.1 to 0.5 weight percent based on the total weight of (a) and (b).

4. The process of claim 1 wherein the catalyst is employed in a solution where the solvent is water or glycerine.

5. The process of claim 4 wherein the catalyst solution contains from 1 to 40 weight percent of the catalyst.

6. The process of claim 5 wherein the catalyst solution contains from 10 to 25 weight percent of the catalyst.

7. The process of claim 1 wherein the blowing agent is water.

8. The process of claim 7 wherein water is employed as the blowing agent in an amount equal to or greater than 5 parts of water per 100 parts of polyether polyol.

9. The process of claim 1 wherein the catalyst is a mixture of hexamethylenetetramine and 1,3,5-tris(dimethylaminopropyl)-s-hexahydrotriazine.

10. The process of claim 1 wherein the foam stabilizer is a polysiloxane-polyoxyalkylene block copolymer.

* * * * *